United States Patent
Sadri et al.

(10) Patent No.: US 10,428,243 B2
(45) Date of Patent: Oct. 1, 2019

(54) METHOD OF UTILIZING THIN FILM PRESSURE SENSITIVE STRIPS TO MEASURE PRESSURE APPLIED TO A SEAL

(71) Applicant: FORD MOTOR COMPANY, Dearborn, MI (US)

(72) Inventors: Hossein Jacob Sadri, Novi, MI (US); Stephen Juszczyk, Walled Lake, MI (US)

(73) Assignee: FORD MOTOR COMPANY, Dearborn, MI (US)

(*) Notice: Subject to any disclaimer, the term of this patent is extended or adjusted under 35 U.S.C. 154(b) by 219 days.

(21) Appl. No.: 15/370,550

(22) Filed: Dec. 6, 2016

(65) Prior Publication Data

US 2018/0155577 A1    Jun. 7, 2018

(51) Int. Cl.
| | |
|---|---|
| *C09J 5/10* | (2006.01) |
| *B29C 65/00* | (2006.01) |
| *B60J 10/50* | (2016.01) |
| *B60J 10/84* | (2016.01) |
| *B60J 10/00* | (2016.01) |

(52) U.S. Cl.
CPC .............. *C09J 5/10* (2013.01); *B29C 66/98* (2013.01); *B60J 10/00* (2013.01); *B60J 10/50* (2016.02); *B60J 10/84* (2016.02); *Y10T 29/4978* (2015.01); *Y10T 29/49776* (2015.01); *Y10T 29/49778* (2015.01)

(58) Field of Classification Search
CPC .. B60J 10/84; C09J 2201/122; C09J 2203/30; Y10T 29/4978; Y10T 29/49776; Y10T 29/49778; B29C 65/82; B29C 65/8238; B29C 65/8246; B29C 65/8215; B29C 66/964; B29C 66/98; B29C 66/97

See application file for complete search history.

(56) References Cited

U.S. PATENT DOCUMENTS

| | | | | |
|---|---|---|---|---|
| 6,372,341 | B1* | 4/2002 | Jung | G09F 3/0292 428/354 |
| 6,499,257 | B1* | 12/2002 | Tsuchida | B60J 10/248 49/493.1 |
| 6,918,167 | B2* | 7/2005 | Hughes | B60J 5/0431 228/139 |
| 2002/0144388 | A1* | 10/2002 | Mercier | B62D 65/06 29/407.01 |
| 2002/0170160 | A1* | 11/2002 | Savoy | B62D 65/06 29/407.1 |

(Continued)

OTHER PUBLICATIONS

Sensor Expert—The Force in Surface Contact Pressure, 2013 SensorExpert.com.

*Primary Examiner* — Jermie E Cozart
(74) *Attorney, Agent, or Firm* — Brandon Hicks; Brooks Kushman P.C.

(57) ABSTRACT

A method of assembling a door on a vehicle begins by identifying critical fit areas between the door seal and the door frame. Pressure indicator tape is adhered to the seal in critical fit areas and the door is closed against the seal to produce a marking on the pressure indicator tape. Intensity of the marking is visually compared to a reference pressure intensity scale to establish an observed pressure intensity level. The observed pressure intensity level may be recorded, correlated to a specific critical fit area and analyzed to make operational and design improvements to the door, door frame or seal.

13 Claims, 3 Drawing Sheets

(56) References Cited

U.S. PATENT DOCUMENTS

2003/0051328 A1\* 3/2003 Song ............... B62D 65/06
 29/428
2009/0206615 A1\* 8/2009 Kovie ............... E05B 83/38
 292/336.3

\* cited by examiner

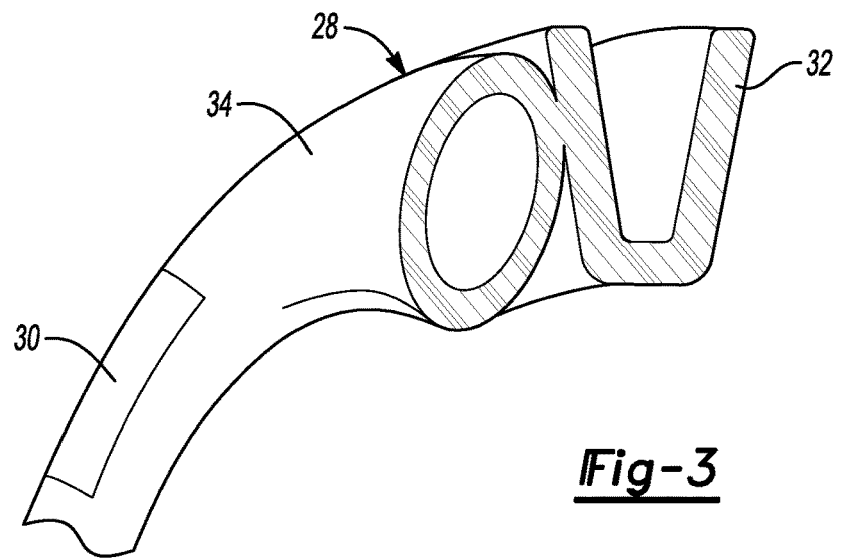
*Fig-3*
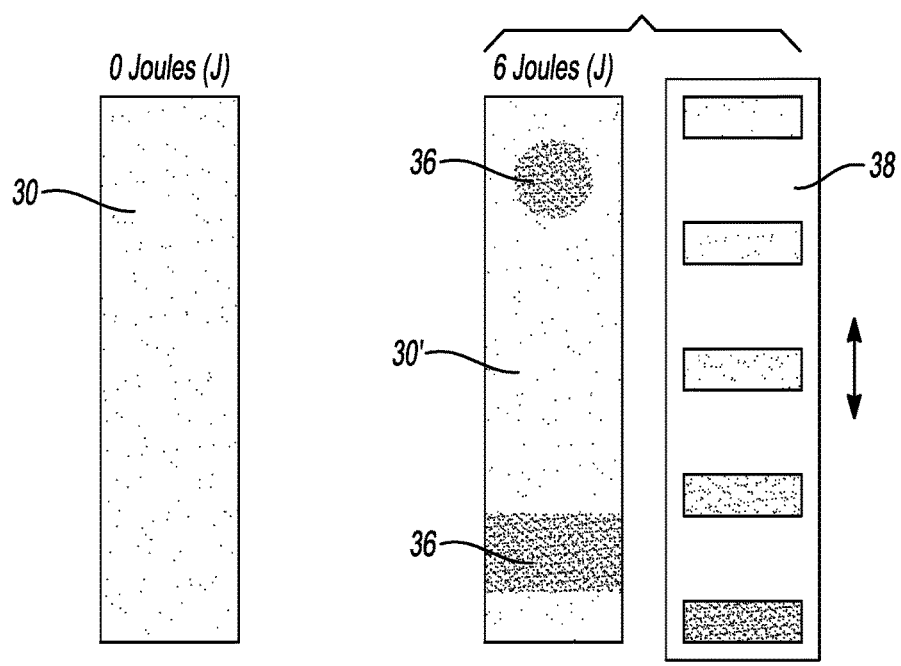
*Fig-4A*  *Fig-4B*

METHOD OF UTILIZING THIN FILM PRESSURE SENSITIVE STRIPS TO MEASURE PRESSURE APPLIED TO A SEAL

TECHNICAL FIELD

This disclosure relates to a method of measuring the pressure applied by a seal on a closure member of a vehicle to reduce wind noise.

BACKGROUND

In vehicle assembly operations, closure members such as doors and trunk lids must be accurately assembled within a door frame, trunk opening, hood opening, or the like. When a closure member is misaligned or the closure member or the frame is out of tolerance, areas around the closure member may exert insufficient or excessive pressure on a peripheral seal. Insufficient pressure on a seal may result in a water leak or wind noise, vibration and harshness (NVH) issues. Excessive pressure on a seal may result in high effort being required to close a door.

This disclosure is directed to solving the above problems and other problems as summarized below.

SUMMARY

According to one aspect of this disclosure, a method is disclosed for assembling a vehicle that comprises identifying critical fit areas between closure members and frames defining openings to be closed by the closure members. According to the method, pressure indicator tape is adhered to the critical fit areas. The closure member is then closed against an opening defined by the vehicle to activate the pressure indicator tape and produce a marking. The intensity of the marking is visually compared to a reference intensity scale to establish an observed intensity level.

According to other aspects of this disclosure, the method may further comprise recording the observed intensity level in a vehicle record. The method may further comprise analyzing the observed intensity level to create analytical data.

Operational improvements may be made immediately to an assembly process to change the relative orientation of the closure member and the opening. Design improvements may also be made to the closure member, the opening defined by the vehicle or a seal disposed between the closure member and the opening.

According to another aspect of this disclosure, a method is disclosed for assembling a door on a vehicle that comprises identifying a critical fit area between the door, a seal and a door frame. Pressure indicator tape is then adhered to the seal in the critical fit area. The door is then closed against the seal to produce a marking on the pressure indicator tape. The intensity of the marking is visually compared to a reference pressure intensity scale to establish an observed pressure intensity level.

The method may also be applied to a plurality of critical fit areas and the door may be closed on a plurality of pressure indicator tapes to produces marks that are compared to the reference pressure intensity scale to establish a plurality of observed pressure intensity levels at the critical fit areas. The observed pressure intensity levels may be correlated to specific critical fit areas in the vehicle record.

The above aspects of this disclosure and other aspects will be described below with reference to the attached drawings.

BRIEF DESCRIPTION OF THE DRAWINGS

FIG. 3 is a cross-sectional view of the door opening seal taken along the line 3-3 in FIG. 2.

FIG. 4A is a plan view of a segment of pressure indicator tape before pressure is applied to the tape.

FIG. 4B is a plan view of a segment of pressure indicator tape after pressure is applied to the tape by closing the door shown next to a pressure intensity scale.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
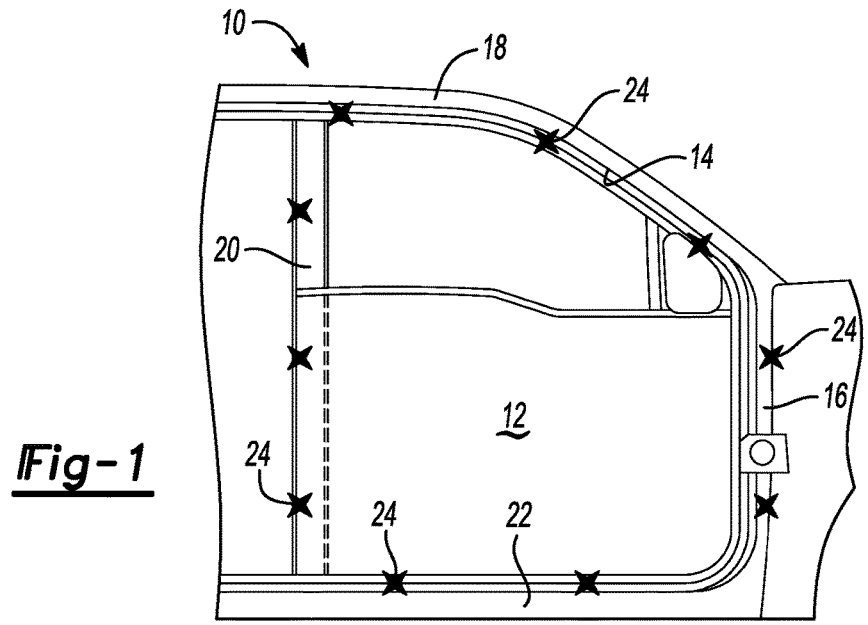
FIG. 1 is a fragmentary side elevation view of a vehicle with a closed front door with X markings around the door illustrating a plurality of critical fit locations.

Referring to FIG. 1, a vehicle generally indicated by reference numeral 10 is partially shown in the area of a front door 12. The front door 12 is shown disposed over a door opening 14. The door opening 14 is formed by an A-pillar 16 on a front edge, a roof rail 18 on a top edge, a B-pillar 20 on a rear edge and a rocker panel 22 on a lower edge. Ten different critical fit areas 24 are indicated by stars spaced about the A-pillar 16, roof rail 18, B-pillar 20 and rocker panel 22. The critical fit areas 24 are areas where the door 12, or closure member, may exert insufficient or excessive pressure on a peripheral seal. The critical fit areas 24 may result in water leaks or wind noise issues. Excessive pressure in a seal may cause high effort being required to close the door.

Figure 2:
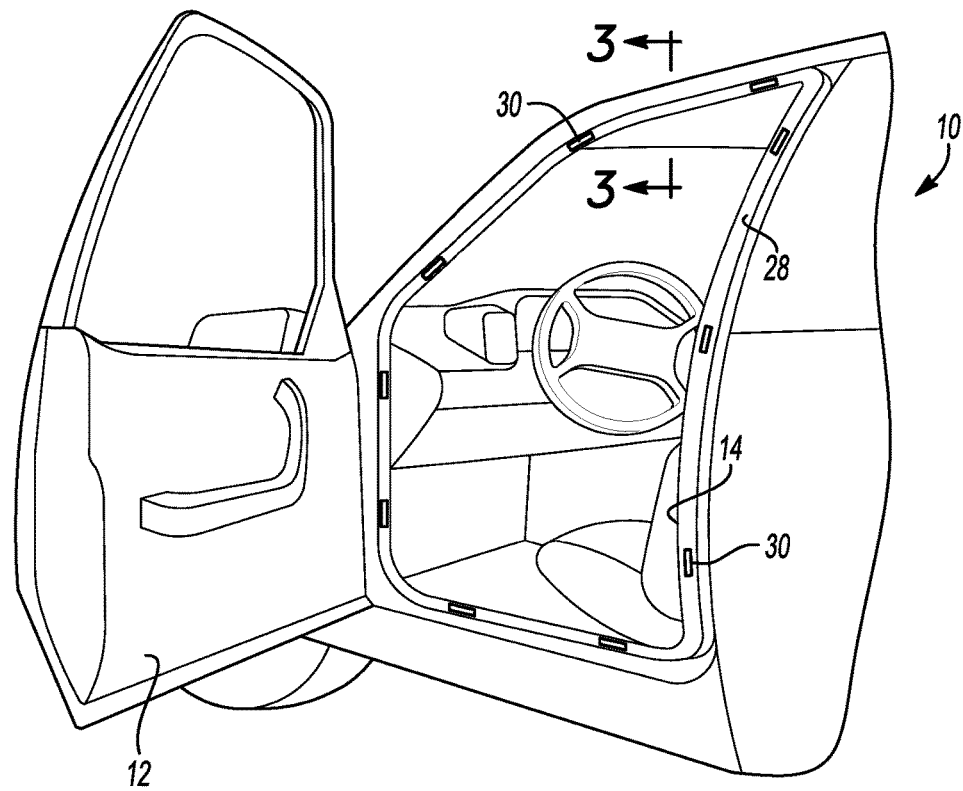
FIG. 2 is a fragmentary perspective view of a vehicle with an open front door with a plurality of segments of pressure indicator tapes attached to a seal secured to the door frame.

Referring to FIG. 2, the vehicle 10 is again shown with the door 12 open. The door opening 14 is fitted with a seal 28 that extends around the periphery of the door opening 14. A plurality of segments of pressure indicator tape 30 are attached by pressure sensitive adhesive to the seal 28 in the locations corresponding to the critical fit areas 24 shown in FIG. 1.

Referring to FIG. 3, a seal (generally indicated by reference numeral 28) is shown to include a seal flange receptacle 32 that is preferably integrally molded with a seal tube 34. A segment of pressure indicator tape 30 is shown attached to the seal tube 34 on the side of the seal tube 34 that is to be contacted by the door 12 shown in FIGS. 1 and 2 when the door 12 is closed. The seal flange receptacle 32 is adapted to be secured to a flange provided on the door opening 14.

Referring to FIG. 4A, a segment of pressure indicator tape 30 is shown prior to being used to indicate pressure in a test. The tape 30 is shown prior to application of energy to the surface (O Joules). Referring to FIG. 4B, a segment of pressure indicator tape 30' prime is shown after being used in the pressure test. The pressure indicator tape 30' shown in 4B includes pressure markings 36 that are caused when the door is closed against the door opening 14 (shown in FIGS. 1 and 2) with a force of 6 Joules. A pressure intensity scale 38 is shown next to the pressure indicator tape 30' in FIG. 4B to illustrate the step of visually comparing the intensity of the pressure markings 36 to a reference pressure intensity scale 38.

Figure 5:
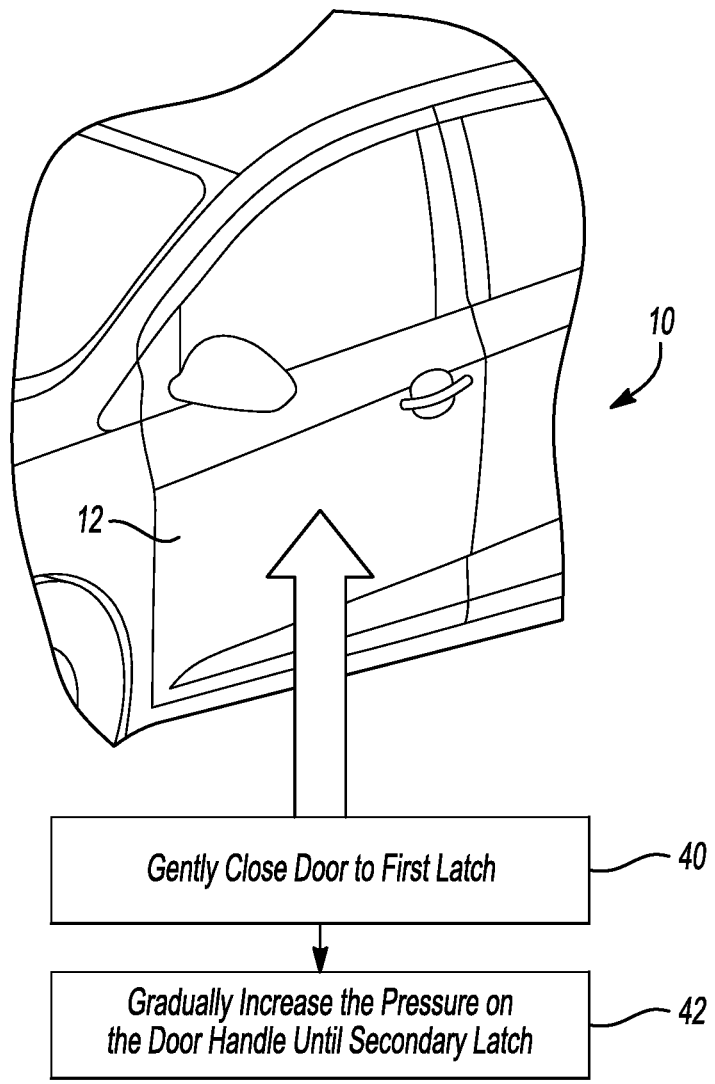
FIG. 5 is a diagrammatic partial perspective view of the steps taken according to the method to close the door and test the pressure applied in the critical fit areas.

Referring to FIG. 5, the test procedure is diagrammatically illustrated. In the first step, the door 12 is gently closed to the first latch point of the door latch at 40. The pressure on the door handle is then gradually increased at 42 until the secondary latch of the door latch is engaged upon complete closure of the door 12. The door 12 must be gently closed to avoid erroneous pressure readings caused by impacting the seal 28 that may occur if the door 12 is closed with excessive force.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of assembling a vehicle comprising:
   identifying critical fit areas between a closure member and a closure member frame;
   adhering plural pressure indicator tapes to a peripheral seal in the critical fit areas;
   closing the closure member against the seal to produce a marking on the pressure indicator tapes; and
   comparing visually the marking to a reference pressure intensity scale to establish an observed pressure intensity level.

2. The method of claim 1 further comprising:
   recording the observed pressure intensity level in a vehicle record.

3. The method of claim 1 further comprising:
   analyzing the observed pressure intensity level to create analytical data.

4. The method of claim 3 further comprising:
   making operational improvements to an assembly process to change the relative orientation of the closure member and the closure member frame.

5. The method of claim 3 further comprising:
   making design improvements to the closure member, the closure member frame, or a seal disposed between the closure member and the closure member frame.

6. A method of assembling a door on a vehicle comprising:
   identifying plural critical fit areas between the door, a peripheral seal and a door frame;
   adhering pressure indicator tapes to the peripheral seal in the critical fit areas;
   closing the door against the peripheral seal to produce a marking on the pressure indicator tapes; and
   comparing the marking visually to a reference pressure intensity scale to establish an observed pressure intensity level.

7. The method of claim 6 wherein closing the door on the door frame produces marks on the pressure indicator tapes that are compared to the reference pressure intensity scale to establish a plurality of observed pressure intensity levels at the critical fit areas.

8. The method of claim 6 further comprising:
   recording the observed intensity level in a vehicle record that is correlated to a specific critical fit areas.

9. The method of claim 6 further comprising:
   analyzing the observed pressure intensity level to create analytical data for each critical fit area.

10. The method of claim 9 further comprising:
    making operational improvements to an assembly process to change the relative orientation of the door and the door frame.

11. The method of claim 9 further comprising:
    making design improvements to the door, the door frame, or the seal.

12. The method of claim 6 wherein the step of closing the door against the seal includes:
    closing the door to a first latch point with a first level of pressure on a door handle; and
    increasing the pressure on the door handle above the first level of pressure until the door is completely closed at a second latch point.

13. A method of assembling a vehicle comprising:
    identifying critical fit areas between a closure member and a closure member frame:
    adhering plural pressure indicator tapes to a peripheral seal in the critical fit areas;
    closing the closure member against the seal to produce a marking on the pressure indicator tapes; and
    comparing visually the marking to a reference pressure intensity scale to establish an observed pressure intensity level wherein the step of closing the closure member against the seal includes:
    closing the closure member to a first latch point with a first level of pressure on a door handle; and
    increasing the pressure on the door handle above the first level of pressure until the closure member is completely closed at a second latch point.

* * * * *